B. F. PRATT.
SCOOP.
No. 185,961. Patented Jan. 2, 1877.
Fig. 1. Fig. 2.
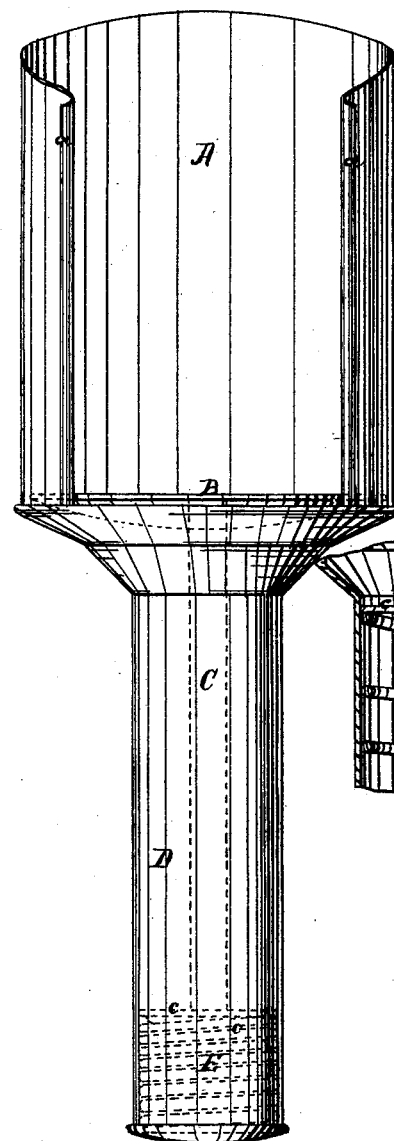
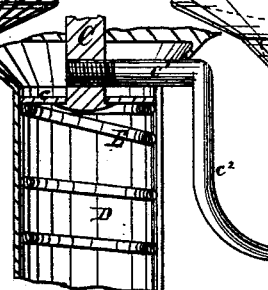
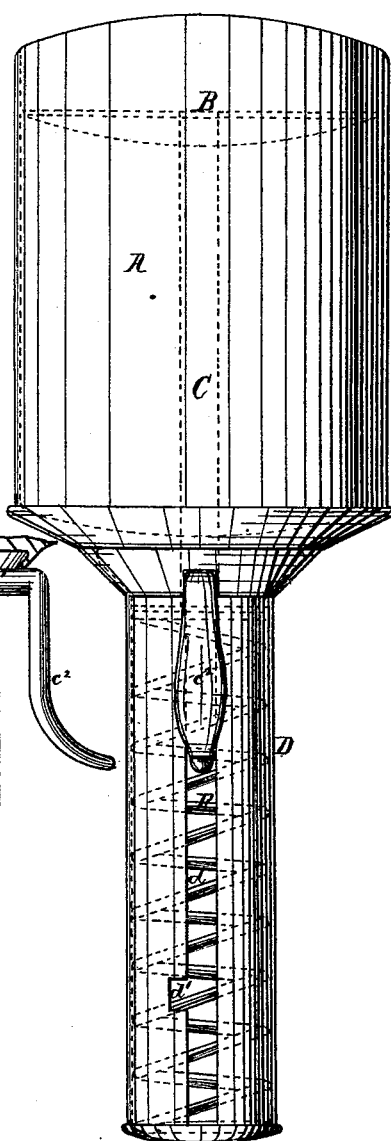
Fig. 3.
Witnesses:
Theodore Hooster.
B. S. Clarke.
Inventor:
Benjamin F. Pratt
By Fitch & Fitch
Attys.

UNITED STATES PATENT OFFICE.

BENJAMIN F. PRATT, OF GREENUP, KENTUCKY.

IMPROVEMENT IN SCOOPS.

Specification forming part of Letters Patent No. 185,961, dated January 2, 1877; application filed July 7, 1876.

*To all whom it may concern:*

Be it known that I, BENJAMIN F. PRATT, of Greenup, county of Greenup, in the State of Kentucky, have invented an Improved Scoop, of which the following is a full, clear, and accurate description, reference being had to the accompanying drawing, forming part of this specification.

My invention relates to that class of scoops which are used by hand, and are adapted to move lard and other similar substances from one vessel to another; and it consists in a disk or plunger fitted against the interior walls of the scoop, and mounted upon a rod which extends into a hollow handle, wherein, about said rod, is arranged a coil-spring, together with an arm or stud extending outwardly from said rod through a slot in the handle, provided with a lock-notch, the said arm or stud having a convenient thumb-piece, whereby the disk may be depressed in the scoop to the base or rear end thereof, the rod carrying it acting to compress the spring in the handle, and the scoop then be in position to be filled, and whereby, by releasing the spring, the disk will thereby be carried forward in the scoop, and the substance therein contained entirely discharged from the scoop, as hereinafter particularly set forth and described.

Figure 1 is a plan or top view of my improved scoop. Fig. 2 is an under-side view of same; and Fig. 3 is a central sectional view longitudinally of the hollow handle, showing the arrangement of coil-spring, disk, rod, &c.

A is the scoop. This I prefer to make nearly cylindrical in form—that is, with the sides carried up and somewhat toward each other over the top, as shown. By this means the open top of the scoop is lessened in size, and the walls of the scoop form a more convenient inclosure or bearing for the disk. The edges $a$ of the sides of the scoop at the top I make to project somewhat beyond the exterior of the scoop, so that such edges may be conveniently used to scrape and clean the vessel containing the substance being removed by the scoop, and then gather that which would otherwise remain in the vessel into the scoop.

B is the disk, which is arranged to conform at its perimeter to the shape of the interior of the scoop, as shown, and is adjusted in the scoop, as seen in Fig. 2. This disk is mounted upon a rod or plunger, C, which extends through the base of the scoop into the handle D. The handle D is made hollow, as shown, and within it is arranged the coil-spring E, which at one end has a bearing upon the butt of the handle, and at the other bears against a small disk or collar, $c$, secured upon the rear end of the rod C. At the rear end of the said rod is fixed the arm or stud $c^1$, which extends laterally from said rod through a slot, $d$, formed in the handle D, and extending along its entire length, as seen in Fig. 2. Upon the end of the stud $c^1$ is fixed a convenient thumb-piece, $c^2$, and the slot $d$ is provided with a lock-notch, $d'$, as shown.

The operation of my scoop is obvious. On being pressed into any substance—such as lard, for instance—contained in any vessel, the disk B will be forced backward in the scoop to the base thereof, the rod or plunger C passing into the handle D, and within the coils of the spring E, which will thus be compressed by the collar $c$, when, by slipping the stud $c^1$ into the lock-notch $d'$, the plunger and its disk will be prevented from moving while the scoop is withdrawn from the vessel filled. To discharge the scoop, the stud $c^1$ is released from the lock-notch $d'$ by a side pressure upon the thumb-piece $c^2$, when the action of the coil-spring will force the disk B to the forward end of the scoop, thus carrying before it the contents of the scoop, and by its contact with the sides of the scoop entirely removing all adherent substance from the interior of the scoop.

It is evident that the scoop may be made to hold a determined quantity of any given substance, and thus enable a person using it to remove a certain desired amount at one time; also, that the disk will thoroughly cleanse the scoop at each discharge, making it very useful in handling lard and similar sticky substances; also, that it may be employed to pack such substances, the forcible discharge of the contents, the scoop being held in a perpendicular position, causing the contents to be closely and tightly imposed upon the previous discharges; also, that by securing the stud in the lock-notch it may be employed as any ordinary scoop.

What I claim as my invention, and desire to secure by Letters Patent, is—

1. In a scoop, the combination of the scoop A and the disk B, the latter, by means of suitable mechanism, operating to permit the filling and cause the entire discharge of the former, as described, and for the purpose specified.

2. The combination of the scoop A, disk B, plunger C, with its transverse stud $c^1$ and the collar $c$, the hollow handle D, and contained coil-spring E, together with the slot $d$ and lock-notch $d'$, arranged to operate as described, and for the purpose specified.

BENJAMIN F. PRATT.

Witnesses:
 T. R. BROOKS,
 JEHU DYDENSBECKER.